Oct. 5, 1965  A. J. M. HARPENAU  3,209,515
APPARATUS FOR PACKING FRUIT IN BAGS
Filed May 3, 1962  2 Sheets-Sheet 1
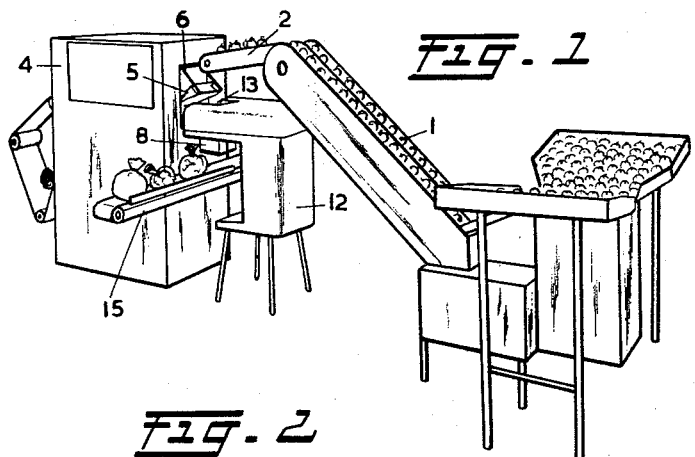
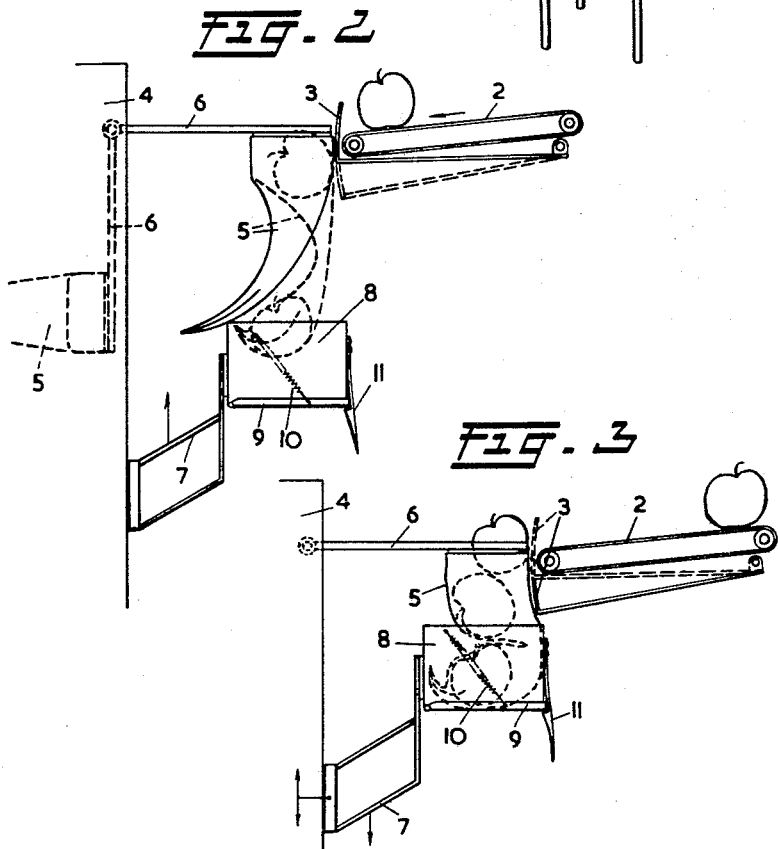
ANTONIUS J. M. HARPENAU
INVENTOR.
BY Wenderoth, Lind and Ponack
ATTORNEYS

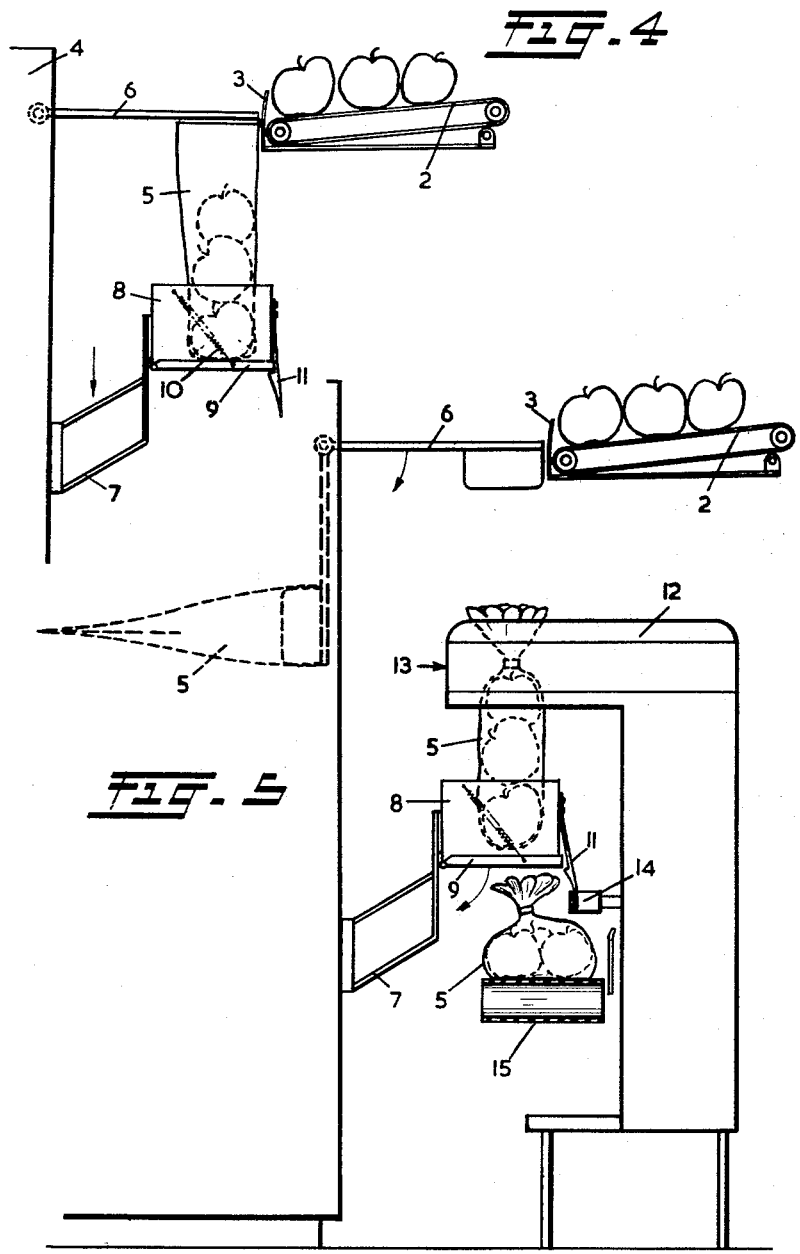

3,209,515
APPARATUS FOR PACKING FRUIT IN BAGS
Antonius Josephus Maria Harpenau, Amsterdam, Netherlands, assignor to "Improha" N.V., Amsterdam, Netherlands, a corporation of the Netherlands
Filed May 3, 1962, Ser. No. 192,211
Claims priority, application Netherlands, June 9, 1961, 265,751
3 Claims. (Cl. 53—247)

The present invention relates to an apparatus of packing fruit in bags wherein the fruit is supplied by way of a dosaging device and each bag is held in open condition in front of the discharge end of the dosaging device, filled with fruit and tied up.

In most self-service shops and stores fruit is nowadays being offered for sale in transparent plastic bags. As a consequence the demand for fruit in packages has increased considerably.

Until recently the packing of fruit has been done manually, but this manner of packing requires a great labour force and is therefore expensive.

Therefore the packing of fruit is also being done mechanically. In this method the open bags are one by one kept under a hopper or chute or dosaging device, filled and tied up by means of a fastening machine.

In the case of delicate fruit, such as summer apples, tomatoes and the like, this method of filling has the disadvantage that the fruit drops into the bag from a height of 20-35 cm. and is apt to become bruised thereby, which reduces the keeping qualities as the fruit soon begins to rot at the bruised spots and then becomes unmarketable.

It is an object of the invention to remove this drawback.

To that effect, according to the invention, the bags are so supported and folded while they are being filled that the fall of the first pieces of fruit is broken in the folds of the bags and the distance which the fruit falls is reduced until the bags contain the correct amount of fruit.

For the performance of this method use is made of a packing apparatus comprising a fruit supply portion, a bag making machine including a bag suspending device, and a machine for binding the full bags, there being arranged, according to the invention, a movable bag supporting member between the suspending device and the binding machine.

In a preferred embodiment of the invention the bag supporting member is movable in the vertical plane.

According to the invention the bag supporting member may consist of an open box the bottom of which can be swung back.

By way of illustration an embodiment of the invention will be described with reference to the accompanying drawings.

FIG. 1 is a perspective view of a fruit packing machine comprising the invention;

FIG. 2 is a side view of the apparatus according to the invention shown in a position in which the first pieces of fruit drop into a bag;

FIG. 3 shows the apparatus according to FIG. 2 in a subsequent stage;

FIG. 4 shows the bag supporting member with a filled bag during its downward movement;

FIG. 5 is a side view of the bag supporting member in its lowest position with the binding machine and the discharge device.

For automatically packing fruit, use is made of a fruit supply belt 1 (FIG. 1) with a dosaging device which, in this embodiment, consists of a conveyor belt 2 provided with an end wall 3 adapted to be swung down, which conveyor belt is operated by way of a microswitch (not shown).

Opposite the dosaging device there is disposed a bag making machine 4 from which plastic bags 5 are one by one supplied and kept in open condition in front of the end of the conveyor belt 2 by means of two hinging arms 6, so that after end wall 3 has moved downwards the fruit lying on the belt drops into a bag.

The bag supply mechanism further comprises a vertically movable box 8 supported on two arms 7 and having a hinged bottom 9 kept up by means of a spring 10 and locked by means of a downwardly prolonged, resilient pawl 11.

The box 8 is movable in recess 13 of a bag closing machine 12. In the lowermost position of the box 8 (FIG. 5) the end of the resilient pawl 11 is opposite an electromagnet 14 mounted on the frame of the bag closing machine 12. Under the box 8 is disposed a conveyor belt 15 for discharging the filled bags.

The apparatus operates as follows:

The supply belt 1 supplies the pre-sorted pieces of fruit (tomatoes, apples, peaches or the like) to the dosaging device 2, where they are temporarily stopped by end wall 3.

Now a bag 5, for example of polyethylene, is pulled from the bag making machine by arms 6 and held with the open end in line with the dosaging device. During this movement of the bag the box 8 is moved upwards, so that the bottom portion of the bag comes to bear on the upper end of the box (FIG. 2). At the same moment the end wall 3 of the dosaging device is moved downwards, and the conveyor belt 2 is put in motion so that the first pieces of fruit fall into the bag. As a result of the fact that the bottom of the bag 5 bears on the edge of the box 8, the first pieces of fruit fall into a fold of the bag (FIG. 2), so that their fall is broken. The weight of the fruit will subsequently pull the bag over the edge into the box 8. Meanwhile the box 8 moves further upwards, so that the fall is reduced and the subsequent pieces of fruit roll gently into the bag (FIG. 3). As soon as the correct number of pieces of fruit has been collected in the bag the end wall 3 is rotated upwards again, so that the supply is discontinued. Subsequently the box moves downwards again (FIG. 4), as a result of which the bag is stretched.

The arms 6 are now moved a little towards one another so that they release the bag and the latter moves downwards along with the box through the opening 13 in the bag closing machine, in which the upper end of the bag is pinched together and provided with a fastener in manners known per se.

As soon as the box 8 is in its lowermost position, the electromagnet 14 is energized. It attracts the resilient pawl 11, as a result of which the bottom 9 of the box falls open through the weight of the bag and the bag slides on to the conveyor belt 15.

The current of the electromagnet 14 is then broken, so that pawl 11 springs back and again locks the bottom 9, which has meanwhile been pulled up by spring 10, whereupon a new cycle begins.

In this embodiment the various moving parts are put into and out of operation electrically by means of microswitches. The moving parts may, however, also be energized mechanically.

It should be understood that the present invention may be otherwise embodied and practiced within the scope of the following claims.

I claim:

1. An apparatus for packing easily damaged items such as fruit in bags and having a bag closing means to which bags are delivered when they have been filled, said apparatus comprising a dosing device for feeding the fruit to be packed, a bag holding means movable laterally to a position adjacent the dosing device for swinging a bag into position adjacent the dosing device and holding the mouth of the bag open upwardly to receive fruit from the dosing device, a movable bag supporting member movable substantially vertically toward and away from the bag holding means for supporting the bottom of the bag, said bag holding means being movable to said position from a point spaced laterally of the path of vertical movement of said bag supporting member, and means for moving said bag holding means, whereby the bag supporting member can be moved upwardly to a first position as the bag holding means is moved laterally so that the bottom of a bag is laid over the bag supporting means to produce a fold in the bag into which the first piece of fruit is dropped, and then is moved to a second position closer to the bag holding means and then away from the bag holding means as fruit is loaded in the bag to a third position adjacent the bag closing means.

2. An apparatus as claimed in claim 1 in which said bag supporting member is an open topped box having a bottom which is swingable downwardly, said box having spring means thereon connected to the bottom of the box urging the bottom of the box to the closed position, said spring means being adapted to yield under the weight of a full bag.

3. An apparatus as claimed in claim 2 in which said box further has a resilient locking pawl thereon locking the bottom of said box closed, and said apparatus further comprises means adjacent the lowermost position to which the box is movable for moving said resilient pawl to the unlocked position.

References Cited by the Examiner

UNITED STATES PATENTS

| | | | |
|---|---|---|---|
| 2,277,783 | 3/42 | Scharf | 53—183 |
| 2,555,585 | 6/51 | Fairbank | 99—171 |
| 2,628,907 | 2/53 | Darden | 99—171 |
| 2,639,069 | 5/53 | West | 53—134 |
| 2,821,828 | 2/58 | Kernen | 53—245 |
| 2,865,157 | 12/58 | Talsma | 53—35 X |
| 2,939,258 | 6/60 | Anness | 53—183 |

FRANK E. BAILEY, *Primary Examiner.*

ABRAHAM H. WINKELSTEIN, BERNARD STICKNEY, *Examiners.*